Patented June 19, 1934

1,963,121

UNITED STATES PATENT OFFICE 1,963,121

TREATMENT OF MATERIALS MADE OF OR CONTAINING CELLULOSE ESTERS

George Holland Ellis, Spondon, near Derby, England, assignor to Celanese Corporation of America, a corporation of Delaware No Drawing. Application May 16, 1929, Serial No. 363,706. In Great Britain June 26, 1928

10 Claims. (Cl. 8—13)

This invention relates to the treatment of yarns, threads, knitted or woven fabrics or other materials made of or containing cellulose acetate or other organic esters of cellulose for the production therefrom of new products having entirely new properties, to the new products so obtained, to the dyeing, printing, stencilling or otherwise colouring of the same, and to the production thereon of discharge effects.

According to the present invention materials made of or containing cellulose acetate or other organic esters of cellulose are subjected to a weighting and a hydrolyzing treatment, the hydrolysis being carried out either before or after the weighting treatment, but preferably after.

The materials treated according to the present invention, i. e. weighted and hydrolyzed, acquire an increased resistance to hot treatments, such as ironing, and an affinity for a very wide variety of colouring matters. Thus for example, not only do the cellulose ester materials so treated retain their affinity for basic dyestuffs and for the insoluble colours especially devised for application thereto and usually applied in solubilized or dispersed form, e. g. the "S. R. A. colours", but they also exhibit an affinity for the direct cotton dyes, for mordant colours both synthetic and natural, for the indigoid and anthraquinone vat colours, and for the sulphur colours.

I have further found that the new materials obtained by treatment according to the present invention are very suitable indeed for the production of discharge effects which hitherto have been very difficult of attainment on cellulose ester materials. Any suitable discharge appropriate to the dyestuff to be discharged may be employed for the purpose of producing the effects, for example reduction discharges, e. g. the formaldehyde-sulphoxylate, formaldehyde-hydrosulphite discharges and the like, or the oxidation discharges, for instance the chlorate discharges used with or without accelerators or catalysts, e. g. salts of iron or vanadium. In the case of discharging vat and sulphur colours, the reduction discharges may be employed together with leucotropic bodies, that is to say substances capable of combining with the leuco compounds of the dyestuffs.

The weighting according to the present invention may be carried out by any suitable process, and the processes described in the following specifications may be instanced:—U. S. Applications S. Nos. 57,956 filed 22nd September 1925, 194,859 filed 27th May 1927, 162,215 filed 19th January 1927, 228,505 filed 24th October 1927 and 178,504 filed 25th March 1927, which applications have issued as Patents Nos. 1,806,048, 1,761,707, 1,821,-464, 1,867,658 and 1,817,741, respectively, and U. S. Application S. No. 309,350 filed 29th September 1928, and British Specifications Nos. 259899 and 260290. These specifications describe inter alia the weighting of cellulose acetate or other cellulose ester materials by first treating with a metal salt solution, for example stannic chloride, and then fixing the metal in insoluble form in the material, for instance by treatment with di-sodium hydrogen phosphate or the like; by treating with a solution of tannic acid of such concentration as to swell the cellulose acetate or other cellulose ester, followed or not by treatment with a fixing agent, for example stannic chloride; or by treating the material either before or during weighting or any stage thereof with a swelling agent for the cellulose ester, for example formic acid, acetic acid, lactic acid, acetone, diacetone alcohol, phenols, thiocyanates, urea, thiourea and their derivatives, the actual weighting being for example carried out either by first treating with a metal salt, e. g. stannic chloride, and subsequently fixing or by first treating with tannic acid and subsequently with a metal salt. One of the most suitable methods of weighting for the purpose of the present invention is to treat the material, as described in U. S. Application S. No. 178,504 filed 25th March 1927, with the weighting metal, for example tin, partly or wholly in the form of thiocyanate.

The hydrolysis of the cellulose ester which should be partial or superficial may be carried out by means of any suitable alkaline reagent, for example caustic soda, caustic potash, sodium aluminate, sodium silicate or the like. As stated above, the hydrolysis may either precede the weighting or follow it, but the preferred method of obtaining the new products of the invention is to weight first and hydrolyze afterwards. In the case of the weighting treatment preceding the hydrolysis, the later may be combined with any process which may be applied for the purpose of fixing the weighting agent or agents in the material. For example, the material made of or containing cellulose acetate or other organic ester of cellulose may first be treated with a solution of stannic chloride or stannic chlorothiocyanate, preferably warm, and thereafter treated with a solution containing both a fixing agent, for instance di-sodium hydrogen phosphate, and a hydrolytic agent, for example caustic soda. In carrying out a fixing of a weighting metal simultaneously with the hydrolysis of the cellulose ester care should in general be taken that the liquor employed has sufficient alkalinity to effect partial or superficial hydrolysis of the cellulose ester material. Attention is particularly drawn to this, since usually a cellulose ester material which has been treated with stannic chloride or a similar reagent retains a considerable amount of acidity which it is essential to neutralize before any hydrolysis sets in.

As already stated the materials treated according to the present invention acquire, in addition to their usual affinity for certain dyestuffs, an affinity for numerous other dyestuffs, for example the direct cotton colours, the vat colours of all kinds, the sulphur colours and the mordant colours, both natural and artificial. These dyestuffs may be applied to the materials by any suitable methods of dyeing, printing, stencilling and the like.

I have moreover found that it is possible to combine the dyeing process either with a process for fixing the weighting metal in the fibre or with the hydrolytic treatment or with both where they are carried out in a single process.

The discharge effects obtainable according to the present invention may be produced on the materials either by dyeing, printing, or otherwise colouring the material with suitable dischargeable dyestuffs and subsequently applying discharges as required, for example in any desired pattern, or by first applying discharges at selected places and subsequently dyeing or otherwise colouring the material with the dischargeable dyestuffs. Moreover the discharges applied may either be white or coloured, that is to say, the discharge may have incorporated therein a dyestuff which resists the discharging agent.

The reduction discharges may be applied, for example, for discharging direct cotton dyestuffs or insoluble dischargeable azo dyestuffs which have been applied in dispersed form, while together with the leucotropic bodies referred to above they may be applied for discharging indigoid and anthraquinone vat colours and sulphur colours. The oxidation discharges, for instance chlorates, may be applied for the discharging of di- and tri-aryl methane, thiazine, oxazine, (including gallocyanines), azine, azo, xanthene and indigoid dyestuffs, as well as many of the insoluble dyestuffs which are applied in dispersed form. The dyestuffs and the discharges (whether used before or after the dyestuffs) may be applied by any suitable dyeing, printing, stencilling or other methods.

As further examples of organic esters of cellulose which may be treated according to the present invention may be mentioned:—cellulose formate, cellulose propionate, cellulose butyrate and the products obtained by the treatment of alkalized cellulose with esterifying agents, e. g. the product known as "immunized cotton" obtained from cotton and para-toluene sulpho-chloride. The invention is not however limited to these specific esters of cellulose but comprises broadly the treatment of materials made of or containing any organic ester of cellulose. In addition to the treatment of materials made entirely of cellulose esters the processes of the present invention may also be applied to mixed goods containing such cellulose esters in association with other fibres or materials not deleteriously or substantially affected by the alkaline solutions employed in the hydrolytic treatment, for example with cotton, cellulose ether artificial silks or fibres or with artificial cellulosic fibres, such for instance as viscose and cuprammonium artificial silks. Furthermore yarns or threads made of or containing cellulose esters which have been treated according to the present invention (i. e. both weighted and hydrolyzed) may be twisted, woven, knitted or otherwise made up with other fibres, for instance fibres which are or may be deleteriously affected by the alkaline solutions employed in the hydrolytic treatment, for instance wool or natural silk, so as to obtain new products giving further novel effects upon dyeing and discharging.

The materials which have been weighted and hydrolyzed according to the present invention present substantial advantages over any cellulose ester materials previously known. Not only do they exhibit an affinity for a very wide variety of colouring matters, but furthermore they may be substantially equal or even superior to untreated cellulose ester materials from the point of view of handle feel etc. In addition, as stated above, they have an increased resistance to hot treatments such as ironing. By carrying out the weighting and hydrolytic treatments separately a very effective control is afforded in regard to the amount of weighting acquired by the fibre and the amount of hydrolysis produced. It is possible to control the processes so that the added weight due to the weighting treatment and loss in weight due to the hydrolysis may be brought as nearly equal as desired, so that on the whole treatment, weighting and hydrolysis, little or no gain or loss in weight occurs. Moreover it apears to be preferable, in order to produce the best effects in the dyeing and discharging, to adjust the weighting and hydrolytic treatments, so that this substantial equality in gain and loss of weight obtains.

The following examples are intended to be purely illustrative and not in any way limitative of the processes of the invention.

Example 1

Woven piece goods of cellulose acetate yarns are impregnated continuously in an aqueous solution (44° Tw.) at 25°–30° C. containing 600 parts by weight of stannic chloride to 240 parts by weight of ammonium thiocyanate and evenly squeezed, the operation being conveniently carried out, for example, on the so-called "padding mangle". The goods are rolled up and kept at 25°–30° C. for 3 hours. They are then washed continuously or in batches for ½ hour, one cold wash water and two warm waters at 50° C. being used during this period. The goods are then treated in any suitable manner in a 5% solution of di-sodium hydrogen phosphate, to which has been added caustic soda equal in weight to 12% on the weight of goods and 1 gram of soap per litre, the temperature being maintained at 75° C. The goods are afterwards washed and treated as follows to obtain a white discharge on a navy ground.

The fabric is dyed with:—

5.8% chlorazol fast blue 2BN.
0.8% chlorazol fast red K (colour index No. 278).
0.5% chlorazol fast yellow 5 GK (colour index No. 346).
40% salt.

and the following discharge paste printed thereon:—

780 grams gum arabic 1:1
150 grams anthraquinone 10%
60 grams zinc oxide
30 grams water
180 grams formosul

1200

After printing, the fabric is dried and steamed for 5 minutes at 5 lbs. in the cottage steamer; then soaped in ¼% soap solution till the yellow colour of the anthraquinone has disappeared.

Example 2

Cellulose acetate woven goods, weighted and saponified as in Example 1, are dyed with indigo by any suitable method, for example by the padding method well known in cotton-dyeing technique. It is then printed with a paste of the following composition:—

- 200 grams leucotrope W.
- 480 grams sodium formaldehyde sulphoxylate.
- 240 grams anthraquinone 10% paste.
- 130 grams zinc oxide.
- 200 grams water.
- 750 grams gum arabic 1:1.

2000

The goods are now dried, steamed for 5 minutes in a "rapid ager" at 102–104° C. and soaped in a solution containing 0.5 gram of soap and 1 gram of soda ash per litre.

*Example 3*

Cellulose acetate woven piece goods are steeped in cold 20% formic acid for 1 hour, lifted, drained, and immersed in a 48° Tw. solution of stannic chloride at 20° C. for 1 hour. After draining and washing thoroughly with cold water till quite acid free, the goods are phosphated in a 5% solution of di-sodium hydrogen phosphate for ½ hour at 40° C. washed off in warm water, and finally soaped in a bath containing 5 grams per litre of neutral soap at 50° C. for 20 minutes and well washed off. The goods are now simultaneously saponified and dyed in a 60:1 bath containing 2% chlorazol fast red K. (colour index No. 278) and 10% caustic soda on the weight of goods, being entered cold, and the temperature raised slowly to 75–80° C. and maintained till the desired shade is achieved.

What I claim and desire to secure by Letters Patent is:—

1. Process for modifying the dyeing properties of materials comprising cellulose esters, comprising subjecting the materials first to a weighting treatment, and then to superficial saponification.

2. Process for modifying the dyeing properties of materials comprising cellulose esters, comprising subjecting the materials first to a weighting treatment and then to a treatment which both fixes the weighting metal and superficially saponifies the material.

3. Process for modifying the dyeing properties of materials comprising cellulose acetate, comprising subjecting the materials first to a weighting treatment, and then to superficial saponification.

4. Process for modifying the dyeing properties of materials comprising cellulose acetate, comprising subjecting the materials first to a weighting treatment and then to a treatment which both fixes the weighting metal and superficially saponifies the material.

5. Process for the treatment of materials comprising cellulose acetate, comprising subjecting the materials first to a weighting treatment and then to a treatment which both dyes and superficially saponifies the material.

6. Process for the treatment of materials comprising cellulose acetate, comprising subjecting the materials first to a weighting treatment and then to a treatment which fixes the weighting metal and simultaneously dyes and superficially saponifies the material.

7. Process for modifying the dyeing properties of materials comprising cellulose acetate, comprising subjecting the materials first to a tin-weighting treatment, and then to superficial saponification.

8. Process for modifying the dyeing properties of materials comprising cellulose acetate, comprising subjecting the materials first to a tin-weighting treatment and then to a treatment which both fixes the tin and superficially saponifies the material.

9. Process for the treatment of materials comprising cellulose acetate, comprising subjecting the materials first to a tin-weighting treatment and then to a treatment which both dyes and superficially saponifies the material.

10. Process for the treatment of materials comprising cellulose acetate, comprising subjecting the materials first to a tin-weighting treatment and then to a treatment which fixes the tin and simultaneously dyes and superficially saponifies the material.

GEORGE HOLLAND ELLIS.